G. F. WEIR.
ENGINE CROSSHEAD.
APPLICATION FILED JULY 19, 1920.

1,381,375.

Patented June 14, 1921.

Witness

Inventor
George F. Weir
Louis Baggevard
Attorney

UNITED STATES PATENT OFFICE.

GEORGE F. WEIR, OF ELKHART, INDIANA.

ENGINE-CROSSHEAD.

1,381,375.   Specification of Letters Patent.   Patented June 14, 1921.

Application filed July 19, 1920. Serial No. 397,358.

*To all whom it may concern:*

Be it known that I, GEORGE F. WEIR, a citizen of the United States, residing at Elkhart, in the county of Elkhart and State of Indiana, have invented certain new and useful Improvements in Engine-Crossheads, of which the following is a specification.

My invention relates to an improvement in engine crossheads, and the primary object is to provide means for the outside admission of the crosshead pin, the present invention including means for forcing and holding the latter in place, and for removing the pin when desired.

In the accompanying drawings:—

Figure 1:
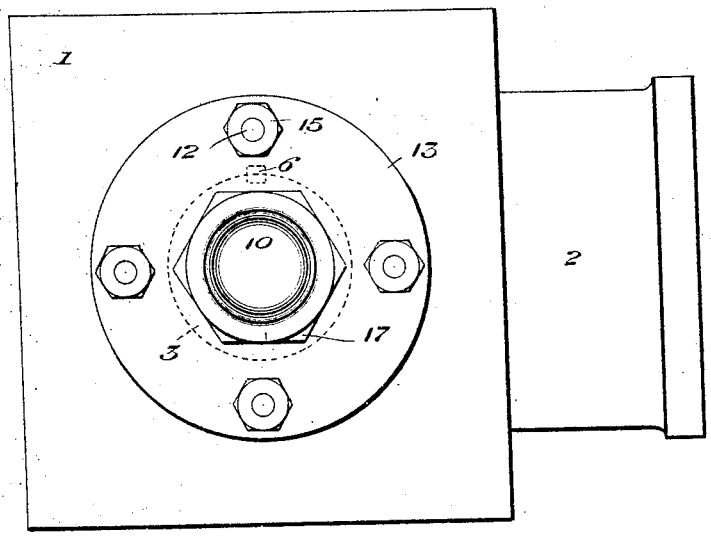
Figure 1 is a side view.

The numeral 1 applies to the crosshead, and 2 is the piston rod socket formed integral with the two sides of the crosshead in the accustomed manner. The numeral 3 indicates the crosshead pin. This crosshead pin has the usual tapers 4 adapted to fit correspondingly tapering orifices 5 in the crosshead, a dowel-pin 6 being employed to prevent its turning.

Figure 2:
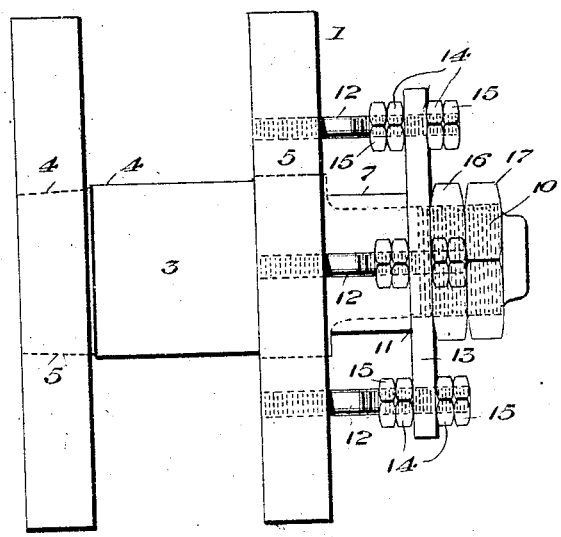
Fig. 2 is an end view.

The crosshead pin 3 has an extension 7 at one end, which protrudes a suitable distance beyond the side of the crosshead. This extension terminates in a screw-threaded outer end 10, thus forming a shoulder 11 between the main portion of the extension and the threaded portion 10. Studs 12, preferably four in number, are tapped equidistantly into one side of the crosshead, as shown in Fig. 2, these studs 12 being threaded at both ends.

A pressure-collar 13 has a large central hole and four smaller holes to receive the extension 7 and the four studs 12, it normally resting against the shoulder 11 of the extension 7.

Nuts 14 and lock nuts 15 are screwed on the threads of the studs 7 on both sides of the pressure collar 13, and a nut 16 and lock nut 17 are screwed on the threads 10 of the extension 7.

The pressure-collar 13 and the several nuts 14 and 16 and lock nuts 15 and 17 are utilized to hold the pin 3 locked securely in place in the crosshead and end of the connecting rod. The tapers 4 of the pin 2 are forced truly and securely home by the pressure collar engaging the shoulder 11 on the extension 7 of the crosshead pin 2 by screwing the outer nuts 14 thereagainst, the inner ends 14 being turned back out of the way temporarily until the pin 2 has been forced snugly into position, after which all nuts are screwed up tight against the pressure collar from both sides, and the parts are thus held securely in place and against accidental displacement.

To remove the crosshead pin 2, the outer nuts 14, 15, 16 and 17 are turned back on their threads, and the inner nuts 14 and 15 are then screwed forward under the pressure collar 13, as far as may be desired. Then to loosen the pin 2, the nut 16 is turned forward on the thread 10 against the pressure collar 13. This delivers a direct pull upon the pin 2, and removes the tapers 4 from the tapering orifices 5, thus loosening the pin. It is then a simple matter to remove it entirely by simply removing all the outer nuts 14, 15, 16 and 17, as well as the pressure collar 13.

I claim:

1. The combination with a crosshead, of a crosshead pin having an extension at one end, the outer end of which is screw-threaded forming a shoulder between the main portion of the extension and the screw-thread, studs projecting from the cross-head, a pressure collar having orifices to receive the threaded end of the extension and the several studs, nuts threaded on the studs on both sides of the pressure collar, and a nut on the threaded end of the extension outside the pressure collar for applying endwise pressure to the crosshead pin and for locking the latter in place.

2. The combination with a crosshead, of a crosshead pin having an extension at one end, the outer end of which is screw-threaded forming a shoulder between the main portion of the extension and the screw-thread, studs projecting from the crosshead, a pressure collar having orifices to receive the threaded end of the extension and the several studs, nuts threaded on the studs on both sides of the pressure collar, a nut on the threaded end of the extension outside the pressure collar for applying endwise pressure to the crosshead pin and for locking the latter in place, and lock nuts for each of said adjusting nuts.

In testimony whereof I affix my signature.

GEORGE F. WEIR.